United States Patent
Ishii

(10) Patent No.: US 6,778,589 B1
(45) Date of Patent: Aug. 17, 2004

(54) SYMBOL SYNCHRONOUS DEVICE AND FREQUENCY HOPPING RECEIVER

(75) Inventor: Satoru Ishii, Mobara (JP)

(73) Assignee: Futaba Denshi Kogyo Kabushiki Kaisha, Mobara (JP)

(*) Notice: Subject to any disclaimer, the term of this patent is extended or adjusted under 35 U.S.C. 154(b) by 0 days.

(21) Appl. No.: 09/414,494

(22) Filed: Oct. 8, 1999

(30) Foreign Application Priority Data

Oct. 9, 1998 (JP) .......................................... 10-288316

(51) Int. Cl.[7] .............................. H04B 1/69; H04L 7/00
(52) U.S. Cl. ...................................... 375/136; 375/354
(58) Field of Search ................................ 375/132, 136, 375/147, 150, 354, 371, 376, 326, 327, 260, 384; 370/208, 503, 516, 520; 327/141, 162

(56) References Cited

U.S. PATENT DOCUMENTS

| | | | | |
|---|---|---|---|---|
| 4,689,626 A | * | 8/1987 | Hori et al. ............. | 342/357.12 |
| 4,914,677 A | * | 4/1990 | Yamaguchi et al. ........ | 375/106 |
| 5,422,917 A | * | 6/1995 | Scott .......................... | 375/371 |
| 5,717,722 A | * | 2/1998 | Mori .......................... | 375/326 |
| 5,815,541 A | * | 9/1998 | Fukushi ..................... | 375/376 |

* cited by examiner

*Primary Examiner*—Young T. Tse
*Assistant Examiner*—Sam K. Ahn
(74) *Attorney, Agent, or Firm*—Oblon, Spivak, McClelland, Maier & Neustadt, P.C.

(57) ABSTRACT

A symbol synchronous device is provided that can maintain symbol synchronization in short time in response to synchronous signals. The symbol synchronous device receives a synchronous signal at a signal point with a different phase degree, the synchronous signal in which the phase rotational direction is reversed to said carrier, and then produces a decision timing in synchronous with a symbol of said digital-modulated signal. The differential output unit 9 and the decision unit 10 detect the reverse timing based on the phase angle δ of a digital-modulated signal with respect to the reference frequency signal. The phase angle is produced by the phase angle calculation unit 8. The XOR integration digital PLL 11 produces clock signals in synchronous with the reverse timing to provide the decision timing.

18 Claims, 9 Drawing Sheets

FIG.4(a) PHASE ANGLE 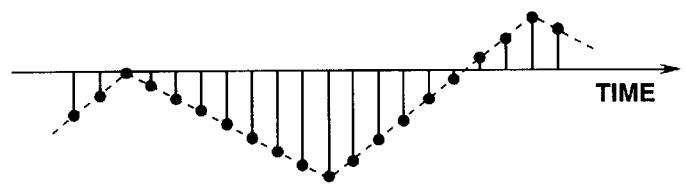
FIG.4(b) DIFFERENTIAL OUTPUT 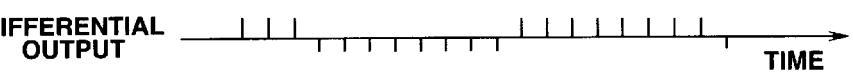
FIG.4(c) DECISION OUTPUT 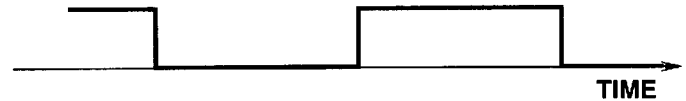
FIG.4(d) XOR-PLL 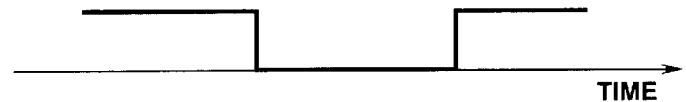
FIG.4(e) XOR 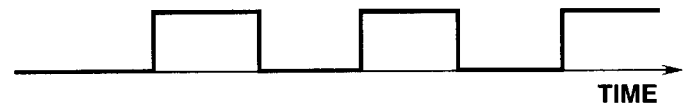
FIG.4(f) CLOCK SIGNAL 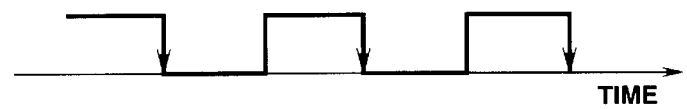

$\delta_0$: INITIAL OFFSET PHASE ANGLE $\Delta$: OFFSET PHASE ANGLE $\delta_1$: SHIFT TO OFFSET PHASE ANGLE

FIG. 9
PRIOR ART
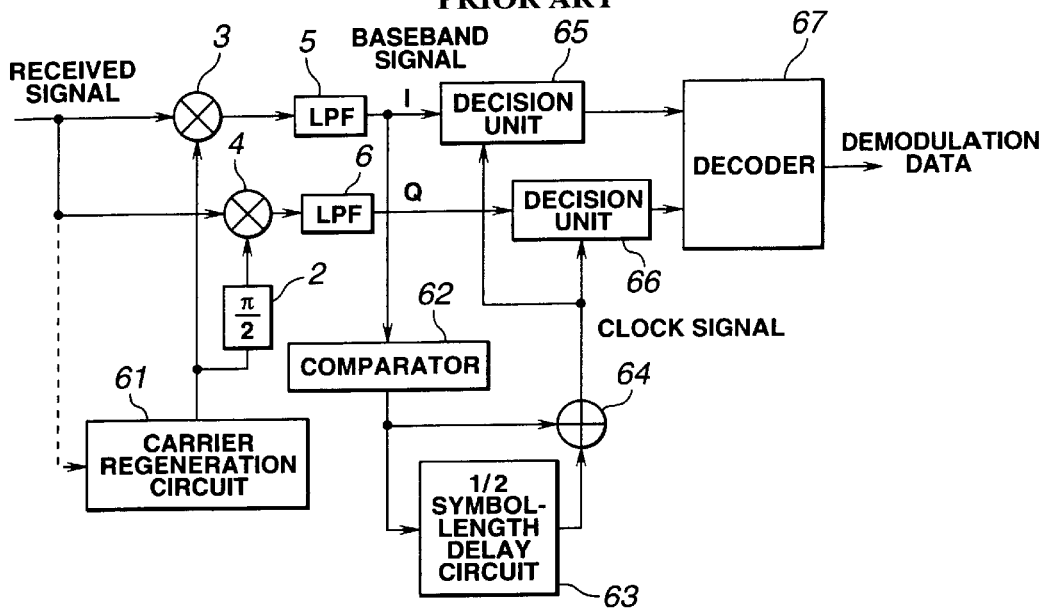
FIG.10(a) BASEBAND SIGNAL I
PRIOR ART
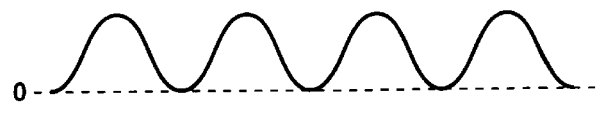
FIG.10(b) BASEBAND SIGNAL Q
PRIOR ART
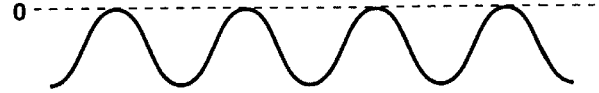
FIG.10(c) OUTPUT OF COMPARATOR 62
PRIOR ART
FIG.10(d) 1/2 SYMBOL-LENGTH DELAY CIRCUIT 63
PRIOR ART
FIG.10(e) OUTPUT OF EXCLUSIVE-OR 64
PRIOR ART
FIG.10(f) OUTPUT OF DECISION UNIT 65
PRIOR ART
FIG.10(g) OUTPUT OF DECISION UNIT 66
PRIOR ART
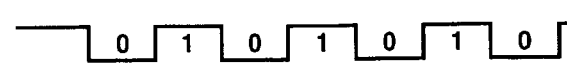

FIG.13(a) TRANSMISSION FRAME
PRIOR ART
FIG.13(b) RECEIVED FREQUENCY
PRIOR ART
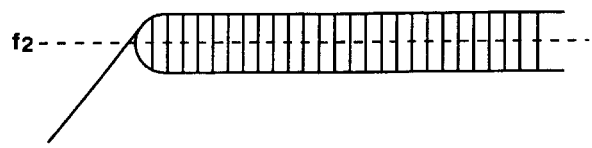
FIG.13(c) CARRIER REGENERATION
PRIOR ART

SYMBOL SYNCHRONOUS DEVICE AND FREQUENCY HOPPING RECEIVER

BACKGROUND OF THE INVENTION

The present invention relates to a symbol synchronous device and a frequency hopping receiver, suitable to demodulate digital-modulated signals, particularly, preferable to use in radio LAN systems.

In the spread spectrum (SS) communication technique, there are various methods including Direct Sequence (DS), Frequency Hopping (FH), DS/FH hybrid, Chirp modulation, and others.

FIG. 7 is a block diagram illustrating a conventional frequency hopping communication system. Referring to FIG. 7, the frequency hopping communication system consists of an encoder 41, a digital modulator 42, a mixer 43, a hopping pattern generator 44, a frequency synthesizer 45, a high-frequency amplifier 46, a transmission antenna 47, a receiving antenna 48, a high-frequency amplifier 49, a mixer 50, a hopping pattern generator 51, a frequency synthesizer 52, a digital demodulator 53, and a demodulator 54.

On the transmission side, the encoder 41 converts transmission data into error detectable correctable transmission data. The digital modulator 42 digital-modulates the transmission data over an intermediate frequency band. Then, the mixer 43 frequency-converts the digital-modulated signal based on the output signal of the frequency synthesizer 45. The frequency synthesizer 45 varies over time the frequency to be frequency-converted according to the hopping pattern produced by the hopping pattern generator 44, thus switching the transmission frequency channel. Thus, the digital-modulated signal is transmitted with the frequency channel according to the hopping pattern. As a result, the digital-modulated signal becomes the spread spectrum signal with a broad frequency band. The spread spectrum signal is amplified by the high-frequency amplifier 46 and then radiated from the transmission antenna 47.

On the receiving side, the spread spectrum signal is received with the receiving antenna 48 and then is amplified by the high-frequency amplifier 49. The mixer 50 inverse-spreads the amplified spread spectrum signal. The hopping pattern generator 51 generates the same hopping pattern in synchronous with the hopping pattern generator 44 on the transmission side. The frequency synthesizer 52 outputs the reference oscillation signal with the same frequency as that of the frequency synthesizer 45 on the transmission side. The frequency synthesizer 52 selectively receives the signal with the same frequency as the transmitted signal and then inverse spreads the transmitted spread spectrum signal to convert into a signal in an intermediate frequency band.

Bandpass fitlers (not shown) pass the reversed spread signal and then transmit the signal components thereof over the received frequency band in each frequency channel to the digital demodulator 53. The digital demodulator 53 performs digital demodulation corresponding to the digital demodulator on the transmission side to obtain demodulated data. The demodulator 54 subjects the demodulated data to the error and correction corresponding to the encoder 41 on the transmission side and then outputs received data.

The digital demodulator 53 multiplies the digital-modulated signal by a regenerated carrier to convert it into the baseband signal. Then, demodulated data is extracted by performing the level decision with the timing of the clock signal in synchronous with the symbol (bit) of the digital-modulated signal.

As the digital modulation method in the current mainstream are listed Frequency Shift Keying (FSK), Phase Shift keying (PSK) such as Quadrature Phase Shift keying (QPSK) and Quadrature Amplitude Modulation (QAM). In the frequency hopping communication system, the FSK digital modulation has been mainly used because of easiness of designing. However, where QPSK, QAM, or the like, performing the so-called IQ modulation, is adopted in the frequency hot communication system, the conventional carrier regenerative method and the symbol synchronous method cannot be applied without any change.

In the frequency hopping communication system, the procedure including symbol synchronization (bit synchronization), frame synchronization and data reception must be carried out every time frequency channel is changed. However, this system has a slow response characteristic to phase changes because the frequency of a carrier jitters in the initial state after a change in frequency and the reference frequency oscillator within the carrier generation circuit is based on the analog PLL system. In the digital modulation such as QPSK and QAM where the phase with respect to a carrier is modulated according to transmission data, it is difficult to regenerate the clock signal symbol-synchronized. Moreover, the symbol synchronization requires a long time. It is required to reduce the time for symbol synchronization as short as possible, in view of an improved throughput of transmission data.

The above-mentioned problem will be specifically described below by referring to the QPSK demodulation circuit in the frequency hopping system.

FIG. 8 is an IQ phase plane coordinate diagram illustrating signal points in 4-phase modulation (QPSK). Referring to FIG. 8, the X-axis represents I-phase in phase with a carrier and the Y-axis represents Q-phase perpendicular to the carrier. Before data is transmitted, the synchronous signals, the signal point in 0° phase and the signal point in 270° phase, for instance, are alternately repeated, so that the continuous synchronous signal where the phase changes ±90° is transmitted. Thus, the carrier regeneration as well as the clock regeneration synchronized with symbols are carried out according to the synchronous signal.

FIG. 9 is a block diagram illustrating the digital demodulator of FIG. 8. Referring to FIG. 9, the digital demodulator consists of a carrier generation circuit 61, a 90° phase shifter 2, demodulation multipliers 3 and 4, low-pass filters 5 and 6, a comparator 62, a ½ symbol-length delay circuit 63, an exclusive OR logic 64, decision units 65 and 66 and a decoder 67.

FIG. 10 is a diagram illustrating waveforms at various portions in the digital demodulator of FIG. 9. FIG. 10 schematically illustrates waveforms at synchronous signal reception.

Generally, carrier regeneration is carried out for the QWPSK demodulation. However, it is impossible to perfectly match the frequency of a carrier of a received digital-modulated signal with the frequency of the reference frequency oscillator on the receiving side. For that reason, the carrier regeneration is carried out based on the received signal to create a copy (replica) of a carrier. The demodulation is carried out using the replica as a reference frequency signal. First, the synchronous signal shown in FIG. 8 is received as a received signal. The carrier regeneration circuit 61 detects the carrier frequency and phase of the received signal based on the synchronous signal so that the replica of the carrier is created.

The carrier regeneration is realized by various methods. Basically, in order to achieve the frequency synchronization, a frequency-multiplied received signal is phase-compared with the output signal from the phase locked-loop (PLL). In the case of the BPSK, the frequency of the received signal is multiplied by 2. In the case of the QPSK, the frequency of the received signal is multiplied by 4.

Each of the demodulation multipliers 3 and 4 receives the created carrier replica and the oscillation signal obtained by phase-shifting the replica by 90° with the phase shifter 2 so that the balanced demodulation can be carried out. The low-pass filter 5 extracts as a baseband component the I-phase baseband signal I, shown in FIG. 10(a), from the demodulation signal. The low-pass filter 6 extracts as a demodulation signal component the Q-phase baseband signal Q, shown in FIG. 10(b), from the demodulation signal. The decision unit 65 decides the level of the baseband signal I with the timing of the clock signal shown in FIG. 10(f). The decision unit 66 decides the level of the baseband signal Q with the timing of the clock signal shown in FIG. 10(g). Then, the decoder 67 corresponding to the location of the QPSK signal point encodes the output of the decision section and then outputs demodulation (detection) data.

The comparator 62 compares the baseband signal I or Q with a predetermined threshold and produces a binary signal with two levels (shown in FIG. 10(c)). As shown in FIG. 10(d), the ½ symbol-length delay circuit 63 delays the output of the comparator 62 by ½ of one symbol length. One symbol is a unit length in one modulation state. The exclusive OR circuit (XOR) 64 receives the output of the comparator 62 and the output of the ½ symbol-length delay circuit 63 and creates a clock signal with a leading timing at the center of one symbol (see FIG. 10(d)). The clock signal is symbol-synchronized with the digital-modulated signal. The level of the baseband signal I shown in FIG. 10(a) and the level of the baseband signal Q shown in FIG. 10(b) are decided with the trailing timing of the clock signal.

FIG. 11 is a block diagram illustrating the carrier regeneration circuit 61 using the Costas loop, shown in FIG. 9. Referring to FIG. 11, like numerals represent the same constituent elements as those in FIG. 9. Hence, the duplicate description will be omitted here. Numeral 71 represents a voltage-controlled oscillator (VCO). Numeral 72 represents a loop filter. Numeral 73 represents a phase error detector.

Referring to FIG. 9, it has been described that the frequency control is performed with received signals. In the Costas loop, the frequency control is substantially performed with received signals. However, specifically, the frequency control is performed with the modulated baseband signals I and Q. The phase error detector 73 calculates the baseband signals I and Q and then outputs a phase error corresponding to the phase difference between a frequency-multiplied digital-modulated signal and the carrier. The loop filter 72 smoothes the phase error and controls the oscillation frequency of the VCO 71. The VCO 71 outputs an oscillation signal in synchronous with the carrier of the digital signal and with the same frequency as that thereof.

In the carrier regeneration circuit 61, shown in FIGS. 9 and 11, the PLL carries out a carrier lock operation. After completion of locking, the output can be used as a replica of the carrier. During the locking operation, the output becomes a signal shifted in frequency and phase to the original carrier.

Since the control signal used for locking the carrier is created by a loop filter with a certain time constant, a delay occurs between the input and the output. This shift decides the response rate of the whole loop. However, when the received signals is input in a burst mode, the whole loop delay causes to take much time to complete the carrier regeneration even if the carrier regeneration starts from the burst leading. Moreover, the operation of symbol synchronization must be started after completion of carrier regeneration. In this case, the length of the preamble must be set to a quite large value for the carrier synchronization and symbol synchronization.

FIG. 12 is an explanatory diagram illustrating changes in frequency of a carrier in the frequency hopping system. In the frequency conversion on the transmission side, the carrier of a digital-modulated signal continuously varies from the frequency $f_1$, to the current frequency $f_2$ and converges on the vicinity of the target frequency $f_2$ after a certain period of time. However, the carrier frequency converges on the target frequency $f_2$ while oscillating at areas near the target frequency $f_2$. In the frequency conversion on the receiving side, the carrier of the digital-modulated signal frequency-converted to an intermediate band converges while oscillating at areas near the intermediate frequency.

FIG. 13 is an explanatory diagram illustrating the starting portion of a transmission frame to be transmitted during one frequency hopping period.

The transmission frame is created after the carrier has been set to the target frequency. The frame format, for instance, first starts from the synchronous preamble. A frame synchronous signal and information data follow the synchronous preamble. The frame format ends with an error detection and correction code. In the preamble duration, the carrier regeneration circuit, shown in FIGS. 9 and 11, performs a phase locking operation and makes the carrier replica effective. At this time, regeneration of the clock signal symbol-synchronized becomes effective in the digital demodulator of FIG. 9.

In the frequency hopping system, the carrier of the digital-modulated signal converted to the intermediate frequency band is shifted from the intermediate frequency at the beginning of the transmission frame. The shift varies over time. The carrier regeneration circuit 61 must respond to variations in the time-varying frequency. However, since the carrier regeneration circuit 61 cannot follow and respond quickly because of the above-mentioned reasons, it is required to lengthen the synchronous preamble. Moreover, since the unit time of the frequency hopping is short, the data transmission time for synchronous preamble becomes short, so that the throughput is worsened.

In the conventional digital demodulator of FIG. 9, even if the carrier replica is locked, the duty ratio of the signal two-leveled by the comparator 62 of FIG. 9 does not become 50% because of the waveform distortion. For that reason, the delay of the ½ symbol-length delay circuit 63 is set improperly. As a result, the clock signal synchronized with the symbol cannot be accurately extracted.

Generally, the carrier synchronization and symbol synchronization are provided with the first received synchronous signal, the symbol-synchronized clock signal can be regenerated, without any re-synchronization, in the transmission data section following the synchronous signal. However, if there is a deviation between the frequency of the carrier of a digital-modulated signal and the reference frequency, the phase difference of the carrier to the reference frequency is enlarged or the fluctuation of the deviation over time varies the phase angle. Hence, even if the timing of the clock signal is matched with a signal point, the phase angle shifts from the phase at a predetermined signal point on the phase plane coordinate at the time the signal point is modulated with the reference frequency. As a result, demodulation cannot be performed with the timing.

In the frequency hopping system as described above, the problem is that the current technique cannot deal with regenerating the carrier at high rate, regenerating the clock symbol-synchronized at high rate, and performing demodulation following the frequency change and phase variation of a carrier.

SUMMARY OF THE INVENTION

The present invention is made to solve the above-mentioned problems.

The objective of the invention is to provide a symbol synchronous device that can maintain symbol synchronization in short time, in response to synchronous signals. Moreover, the further objective of the present invention is to provide a frequency hopping receiver using the symbol synchronous device.

The objective of the present invention is achieved by a symbol synchronous device that receives a synchronous signal at a signal point with a different phase degree to a carrier, the synchronous signal in which the phase rotational direction is reversed to the carrier, and then produces a decision timing in synchronous with a symbol of the digital-modulated signal, comprising reverse timing detection means for detecting a reverse timing at which the rotational direction of the phase angle of the digital-modulated signal is reversed; and clock signal output means for outputting a clock signal providing the decision timing in synchronous with the reverse timing.

Since the reference frequency signal does not match with the frequency of the carrier of a digital-modulated signal, the decision timing symbol synchronized can be provided even if the phase angle of the carrier of the digital-modulated signal varies with respect to the reference frequency signal. As a result, the symbol synchronization can be established in a short time. This system can shorten the length of the synchronous signal in a burst mode transmission, thus improving the throughput.

Moreover, even if there is no carrier regeneration circuit, demodulation data can be decided without being influenced by shifts and variations in frequency between the transmission device and the communication device.

In the symbol synchronous device according to the present invention, the reverse timing detection means detects the reverse timing based on a phase angle of the digital-modulated signal with respect to a reference frequency signal.

This feature allows the reverse timing to be easily detected.

In the symbol synchronous device according to the present invention, the reverse timing detection means detects the reverse timing based on a change in polarity of a differential of a phase angle of the digital-modulated signal.

Therefore, this system can detect the reverse timing without being influenced by fluctuations in frequency deviation.

In the symbol synchronous device according to the present invention, the reverse timing detection means detects the reverse timing based on a change in frequency of the digital-modulated signal.

Therefore, this system can easily detect the reverse timing.

In the symbol synchronous device according to the present invention, the clock signal output means produces a pulse signal and controls the oscillation frequency of the pulse signal according to an integration value of phase errors between the pulse signal and a reference pulse signal reversed at the reverse timing, thus outputting clock signals in synchronous with the reverse timing.

This system can generate clock signals synchronized with symbols of the signal digital-modulated in a short time, based on the reverse timing.

According to the present invention, a frequency hopping receiver comprises a symbol synchronous device that receives a synchronous signal at a signal point every time a frequency channel changes, the signal point having a different phase degree to a carrier, the synchronous signal in which the phase rotational direction is reversed to the carrier, and then produces a decision timing in synchronous with a symbol of the digital-modulated signal. The symbol synchronous device has reverse timing detection means for detecting a reverse timing at which the rotational direction of the phase angle of the digital-modulated signal is reversed; and clock signal output means for outputting a clock signal providing the decision timing in synchronous with the reverse timing.

This system has the foregoing functions and effects. Moreover, the system can start a symbol synchronous operation even in the period during which the carrier frequency does not stabilized immediately after a frequency switching operation, thus reliably performing symbol synchronization in a short time.

BRIEF DESCRIPTION OF THE DRAWINGS

This and other objects, features, and advantages of the present invention will become more apparent upon a reading of the following detailed description and drawings, in which:

FIGS. 4(a)~4(f) are explanatory diagrams schematically illustrating numerical data and waveforms to explain the operation of the symbol synchronous device shown in FIG. 1;

FIG. 9 is a block schematic diagram illustrating the digital demodulator shown in FIG. 8;

FIGS. 10(a)~10(g) are waveform diagrams illustrating waveforms at various portions in the digital demodulator shown in FIG. 9;

FIGS. 13(*a*)–13(*c*) are explanatory diagrams illustrating the starting portion of a transmission frame to be transmitted during one frequency hopping period.

DETAILED DESCRIPTION OF THE PREFERRED EMBODIMENTS

An embodiment of the present invention will be described below with reference to FIGS. 1 to 6.

Figure 1:
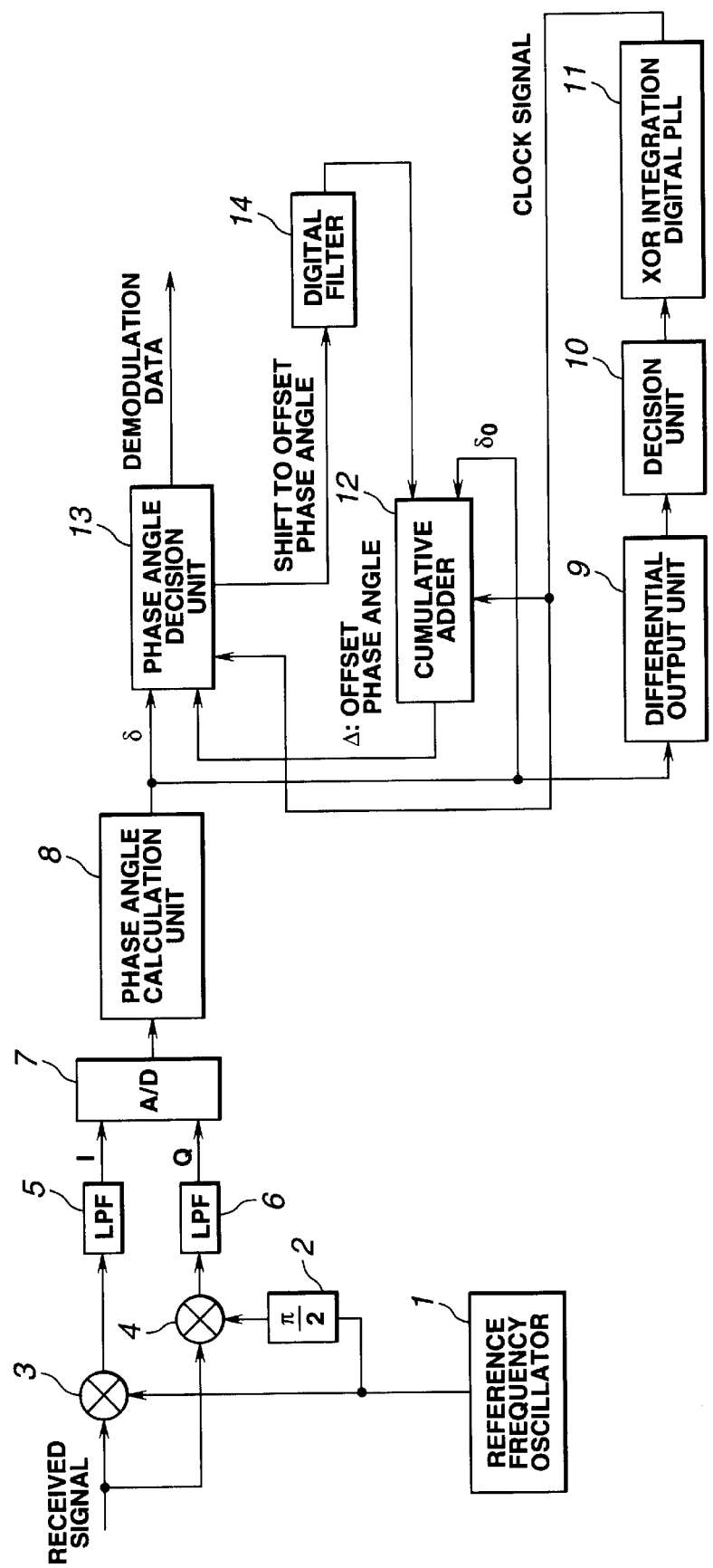
FIG. 1 is a block circuit diagram illustrating a symbol synchronous device according to a first embodiment of the present invention.

FIG. 1 is a block diagram illustrating a symbol synchronous device according to the first embodiment of the present embodiment. Referring to FIG. 1, like numerals represent the same constituent elements as those in FIG. 9. The symbol synchronous device includes a reference frequency oscillator 1, an A/D converter 7, a phase angle calculation unit 8, a differential output unit 9, a decision unit 10, an XOR integration PLL 11, a cumulative adder 12, a phase angle decision unit 13 and a digital filter 14.

Figure 2:
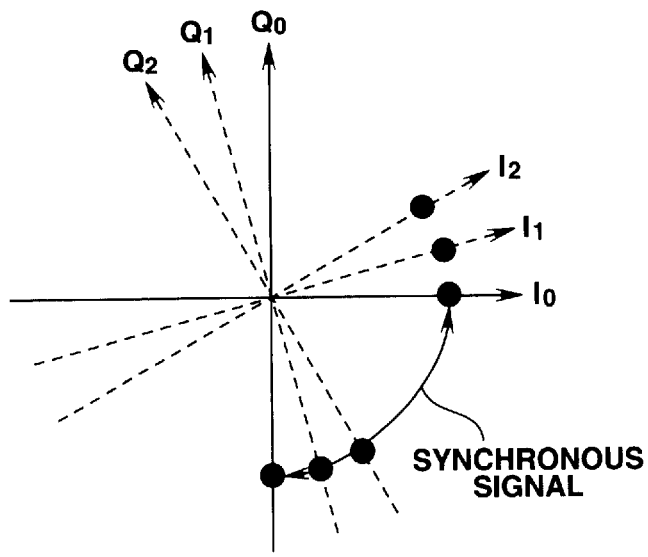
FIG. 2 is an explanatory diagram illustrating movement of the carrier phase plane reference axis of a digital-modulated signal.
Figure 3A:
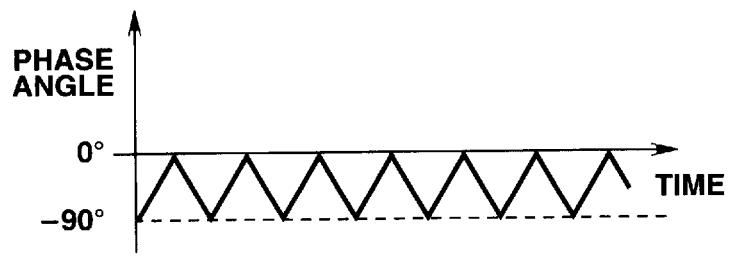
FIGS. 3(a)~3(b) are explanatory diagrams schematically illustrating the phase angle of a digital-modulated signal acting as the reference phase of a reference frequency signal.

FIG. 2 is an explanatory diagram illustrating movement of the carrier phase plane reference axis of a digital-modulated signal. FIG. 3 is an explanatory diagram schematically illustrating the phase angle of a digital-modulated signal acting as the reference phase of a reference frequency signal. FIG. 3(*a*) is an explanatory diagram illustrating the phase angle of a digital-modulated signal in the case of the absence of an offset frequency offset. FIG. 3(*b*) is an explanatory diagram illustrating the phase angle of a digital-modulated signal in the case of the presence of an offset frequency offset. FIG. 4 is an explanatory diagram schematically illustrating numerical data and waveforms to explain the operation of the symbol synchronous device of FIG. 1.

In this embodiment, the symbol synchronous device receives a synchronous signal at a signal point with a different phase degree to a carrier, the synchronous signal in which the phase rotational direction is reversed to the carrier, and then produces the decision timing in synchronous with the symbol of a digital-modulated signal. The symbol synchronous device comprises reverse timing detection means for detecting a reverse timing at which the rotational direction of the phase angle of the digital-modulated signal is reversed; and clock signal output means for outputting a clock signal providing the decision timing in synchronous with the reverse timing. The differential output unit 12 and the decision unit 10 detect a reverse timing based on the phase angle δ of the signal which is digital-modulated to a reference frequency signal and is output from the phase angle calculation unit 8. The XOR integration digital PLL 14 outputs the clock signal providing a decision timing in synchronous with the reversed timing.

This device further includes a carrier phase follower that follows the carrier phase with respect to the reference frequency signal to decide demodulation data. The phase decision section 13 corrects and decides the phase angle of a demodulated signal from the phase angle calculation unit 8 according to the offset phase angle from the cumulative adder 12, with the decision timing of a clock signal synchronized with the symbol of a digital-modulated signal, thus deciding the shift of the offset phase angle. The combination of the digital filter 14 and the cumulative adder 12 updates the offset phase angle based on the shift and has the function equivalent to the carrier regeneration circuit. The received signal QPSK-modulated will be described below.

The demodulation multiplier 3 balanced-demodulates the received signal frequency-modulated to the intermediate frequency band according to the reference frequency signal from the reference frequency oscillator 1 and then outputs the baseband signal I through the low-pass filter 5. The demodulation multiplier 4 balanced-demodulates the received signal frequency-modulated to the intermediate frequency band according to the reference frequency signal from the reference frequency oscillator 1 and then outputs the baseband signal Q through the low-pass filter 6. The A/D converter 7 converts the baseband signals I and Q into numerical data with the timing of the sampling signal. The sampling signal is set to be generated plural times, e.g. 16 times, per period of one symbol (per bit in the baseband signal). In order to see the drawing clearly, FIG. 4 shows 8 sampling signals.

The phase angle calculation unit 8 receives the numerical data and calculates the phase angle δ uniquely determined through a trigonometric function operation or with the lookup table. The phase angle δ is one obtained by discriminating the phase angle of the received digital-modulated signal, with respect to the reference frequency signal. The phase angle δ to be detected based on the levels of the baseband signals I and Q is detected as data covering 360°. The phase angle calculation unit 8 takes a modulo of 360° in calculation but continuously tracks the phase angle δ substantially over 360° and more because the phase angle δ continuously varies.

As already described in the prior art, there is a frequency offset between the transmission side and the receiving side. A crystal oscillator, for instance, acting as the oscillator produces about ±3 ppm to the intermediate frequency of 10.7 MHz. Hence, even if there is no frequency offset factor except the carrier oscillator on the transmission side and the reference frequency oscillator 1 on the receiving side, a phase rotation of 64.2 Hz occurs. Moreover, hopping causes a frequency variation at a transient response to a new frequency. As a result, the carrier frequency of the received digital-modulated signal does not match with the frequency of the reference frequency signal.

Referring to FIG. 2, [$I_0$, $Q_0$] represents the phase plane coordinate axis for a reference frequency signal and the carrier phase rotates counterclockwise. Even if the phase of the reference frequency signal first matches perfectly with the phase of a carrier, the carrier phase plane coordinate axis rotates over time as shown with [$I_1$, $Q_1$], [$I_2$, $Q_2$], . . . In FIG. 2, the frequency of the reference frequency signal is lowered with respect to the carrier.

The signal point of a synchronous signal is at a position (shown with a black dot) on the carrier phase plane coordinate and moves over time on the phase plane coordinate of the reference frequency signal.

As shown in FIG. 3(*a*), when the carrier of a digital-modulated signal matches with the reference frequency signal, the phase angle δ of the synchronous signal periodically varies ±90° on the phase plane coordinate for the reference frequency signal. Each peak of the zigzag represents the signal point of a symbol, that is, the center point between symbol sections. As to each of baseband signals I and Q, each peak of the zigzag line represents the center point between bit sections. In other words, symbols (bits) are synchronized by sampling the baseband signals I and Q with the timing of the peak, so that demodulation data corresponding to the signal point can be extracted. The transient change of the phase angle of the synchronous signal between a signal point and the next signal point is shown with a straight line but is deviated from the straight line according to the waveform of the baseband signal I and the waveform of the baseband signal Q. Normally, the phase angle gently changes like a sine wave because of the influence of the frequency characteristics of the transmission system containing the low-pass filters 5 and 6.

Figure 3B:
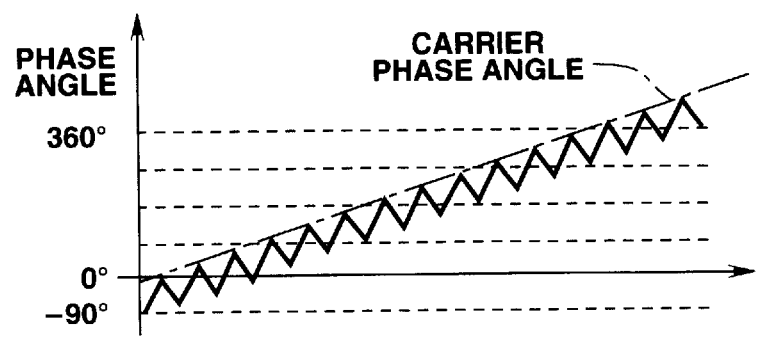

Actually, the carrier phase angle, as shown in FIG. 3(b), is shifted because of an offset between the carrier frequency of a digital-modulated signal and the frequency of the reference frequency signal. FIG. 3(b) shows the carrier phase angle shifted linearly. However, the carrier phase angle vertically drifts with respect to the straight line due to the fluctuation of the oscillation frequency of the reference frequency oscillator 1.

In FIG. 4(a), the numerical value output from the phase angle calculation unit 8 is represented in length. The differential output unit 9 implements a differential process of the phase angle. Specifically, the differential output unit 9 outputs the differential between the numerical value at the previous sampling time and the numerical value at a current sampling time.

In FIG. 4(b), the differential is represented in length. Actually, the differential value of FIG. 4(b) contains the fluctuation because of fluctuation of the phase angle shown in FIG. 4(a). The decision unit 10 decides the positive or negative polarity bit of the differential and then outputs a pulse signal with a duty ratio of about 50% as shown in FIG. 4(c). The pulse signal becomes a reference signal to the XOR integration digital PLL 11 (to be described later).

As described above, each peak of the zigzag shown in FIG. 4(a) represents the time at which an increase or decrease in phase angle changes. This change substantially corresponds to the level transient point of a pulse signal shown in FIG. 4(c). Hence, the fluctuation of the pulse signal shown in FIG. 4(c) is removed. The position of each peak of the zigzag shown in FIG. 4(a) can be easily detected as the level transient point of the pulse signal shown in FIG. 4(c). If the peak position is directly detected based on the output of the phase angle calculation unit 8, without using the differential output unit 9 and the phase decision unit 10, a complicated processing procedure is required because the peak position cannot be simply compared with a predetermined threshold.

The XOR integration PLL 11 can lock the output timing to the reference signal at a high rate. Usually, the XOR integration PLL 11 includes a self-running pulse generator and an exclusive OR logic. In response to the pulse signal (shown in FIG. 4(c)) as the reference pulse signal produced by the decision unit 10, the XOR integration PLL 11 implements an exclusive OR logic of the pulse signal with a duty ratio of 50% internally created and shown in FIG. 4(d). As a result, the phase error between the reference pulse signal and the pulse signal is created as the pulse signal shown in FIG. 4(e). The output with the magnitude corresponding to the phase error is obtained by integrating the pulse signals. The repetitive frequency of the internal pulse generator is corrected by the resultant output so that the phase of the internal pulse generator is locked to the pulse phase of the reference signal output from the decision unit 10.

When the phase continuously becomes a locking state, the XOR integration digital PLL 11 externally outputs the pulse signal (FIG. 4(f)) falling and reversed at the center position of the pulse signal (FIG. 4(d)). The resultant pulse signal becomes a clock signal symbol-synchronized. The clock signal falls down at the center point of the symbol or bit. The XOR integration digital PLL 11 may be realized with only digital circuits. Moreover, the equivalent function may be realized by implementing a numerical operation under a software program.

As described above, even if there is a frequency deviation between the transmission side and the receiving side, the clock signal symbol-synchronized can be regenerated. However, the digital demodulation requires symbol synchronization as well as carrier synchronization. That is, the digital modulation requires following the carrier phase. The reason is that the carrier regeneration in the prior art is not performed but the carrier phase plane coordinate axis rotates over time as shown in FIG. 2 so that the signal point of a digital-modulated signal on the carrier phase plane coordinate rotates. The baseband signal I is the I component on the phase plane coordinate $[I_0, Q_0]$ with respect to the reference frequency signal. The baseband signal Q is the Q component on the phase plane coordinate $[I_0, Q_0]$ with respect to the reference frequency signal. Hence, even if the components I and Q can be sampled at the center of symbol (bit), I and Q components cannot be obtained on the carrier phase plane coordinate $[I_1, Q_1], [I_2, I_2], \ldots$ of a digital-modulated signal.

Figure 5A:
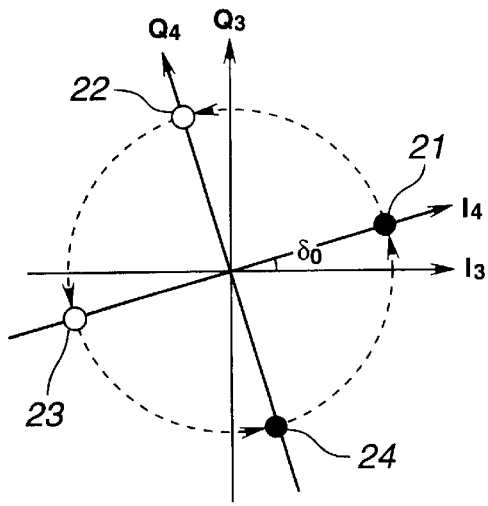
FIGS. 5(a)~5(c) are diagrams for explaining carrier synchronization after symbol synchronization.
Figure 5B:
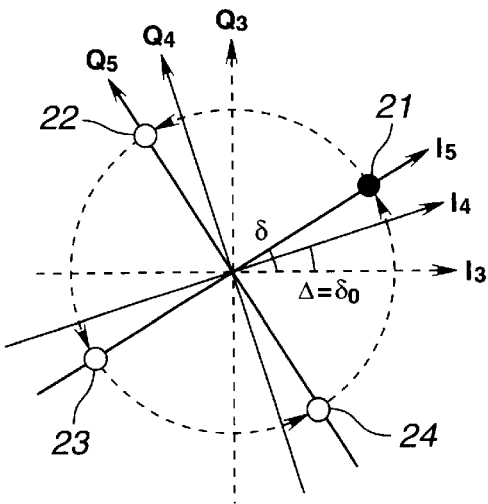
Figure 5C:
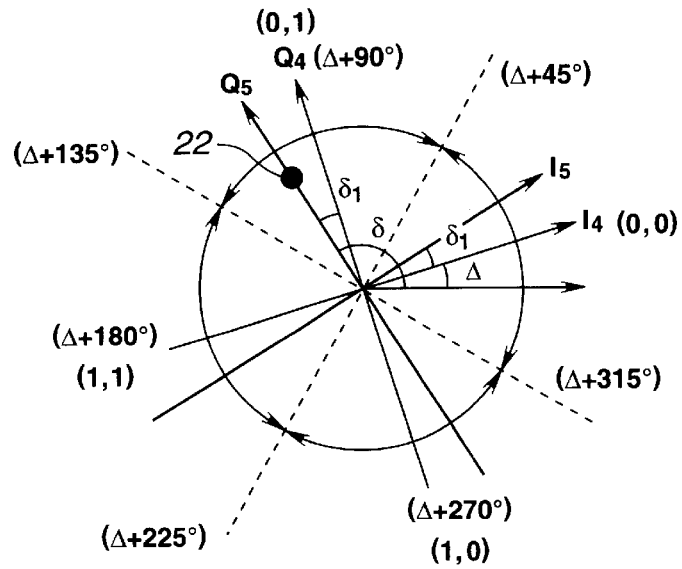

FIG. 5 is an explanatory diagram for explaining carrier synchronization after symbol synchronization. FIG. 5(a) is an explanatory diagram illustrating a phase angle offset $\delta_0$ on completion of symbol synchronization. FIG. 5(b) is an explanatory diagram illustrating a phase angle offset $\delta$ of a digital-modulated signal at the next symbol synchronous timing. FIG. 5(c) is an explanatory diagram illustrating phase angle decision. In FIGS. 5(a), 5(b) and 5(c), numerals 21 to 24 represent signal points, respectively.

As shown in FIG. 5(a), it is assumed that a digital-modulated signal is at the signal point 21 or the symbol center of the synchronous signal [0, 0] at the falling timing of a clock signal output after establishment of carrier synchronization. At this time, the carrier phase plane coordinate axis corresponds to $[I_4, Q_4]$. In the case of the 4-valued PSK (QPSK), the signal point 21 (black dot) provides information about 4 values, together with other signal points (white dots) 22 to 24. In this case, the phase angle calculation unit 8 outputs the phase angle $\delta_0$ to be stored as an initial offset phase angle. Similarly, when the signal point 24 of the synchronous signal is obtained at the falling timing of the timing signal symbol-synchronized, the initial offset phase angle $\delta_0$ can be detected.

Since there is a frequency deviation as shown in FIG. 5(b), the carrier phase plane coordinate axis moves over time. The carrier phase plane coordinate axis moves to $[I_5, Q_5]$ at the next falling timing of the clock signal. If the digital-modulated signal is at the signal point 21, the phase angle calculation unit 8 outputs the phase angle $\delta$ as shown in FIG. 5(b). In some cases, the digital-modulated signal may occupy the signal points 22, 23 and 24. Hence, the signal point is determined with respect to the stored offset phase angle $\Delta$.

For instance, it is assumed that the digital-modulated signal is at the signal point 22 as shown in FIG. 5(c) and that the phase angle calculation unit 8 outputs the phase angle $\delta$. The phase angle decision unit 13 determines the signal point with respect to the offset phase angle $\Delta$, as follows:

If $315° \leq (\delta-\Delta) < 45°$, signal point 21, demodulation data (0, 0);

If $45° \leq (\delta-\Delta) < 135°$, signal point 22, demodulation data (0, 1);

If $135° \leq (\delta-\Delta) < 225°$, signal point 23, demodulation data (1, 1); and If $225° \leq (\delta-\Delta) < 315°$, signal point 24, demodulation data (1, 0).

In FIG. 5(c), since $(\delta-\Delta)$ satisfies $45° \leq (\delta-\Delta) < 135°$, the phase angle decision unit 13 decides that the digital-modulated signal is at the signal point 22 and then outputs (0, 1) as demodulation data.

The carrier phase angle shifted between the immediately preceding timing and the current timing can be found by deciding the signal point. The resultant phase angle corresponds to a shift with respect to a set offset phase angle $\Delta$. That is, the shift is $(\delta-\Delta)$ at the signal point 21; the shift is $(\delta-\Delta-90°)$ at the signal point 22; the shift is $(\delta-\Delta-180°)$ at the signal point 23; and the shift is $(\delta-\Delta-270°)$ at the signal point 24.

A new offset phase angle $\Delta$ may be set by adding the shift to the offset phase angle $\Delta$. In the case of the signal point 22, the shift is $\delta_1$, thus making a new offset phase angle of $(\delta_0+\delta_1)$.

In some cases, the falling timing of the clock signal temporarily shifted may cause the carrier not to accurately match with the symbol center, that is, with the timing of the signal point. In order to overcome such a situation, the offset phase angle $\Delta$ is determined through the digital filter 14, as described below. In a similar manner, a new offset phase angle $\Delta$ is obtained by deciding the signal point with respect to the offset phase angle $\Delta$ and calculating the shift of the phase angle.

The block configuration executing the above-mentioned carrier synchronous operation will be described with reference to FIG. 1. When the initial clock signal falls down after an establishment of symbol synchronization, the cumulative adder 12 receives the phase angle $\delta$ produced by the phase angle decision unit 13 as the initial offset phase angle $\delta_0$. The phase angle decision unit 13 decides the signal point based on the equation $(\delta-\Delta)=(\delta_0-\delta_0)=0$, where $\Delta$ is an offset phase angle and $\delta_0$ is an initial offset phase angle output from the cumulative adder 12.

The phase angle decision unit 13 decides the signal point with the falling timing of the clock signal and then produces demodulation data as well as a shift to the offset phase angle $\Delta$. The shift corresponds to an error amount (within $\pm 45°$) between the signal point (information position) on the carrier phase plane coordinate before one clock timing and the current signal point on the same coordinate. The digital filter 14 calculates an average value of shifts to the offset phase angle for a short period. Unlike the analog filter used in the prior art Costas loop, the digital filter 14 has a very short transmission delay. The cumulative adder 12 adds the shift to the currently-set offset phase angle $\Delta (=\delta_0)$ and then updates it to a new offset phase angle $\Delta$. Hence, the cumulative adder 12 feeds back its output to its input to accumulate the shift every clock timing, thus setting the offset phase angle $\Delta$.

This cumulative operation is repeated to correct the shift every clock timing so that the offset phase angle $\Delta$ can be always maintained nearly to the carrier phase angle. As a result, the phase of a received digital-modulated signal (or information phase) can be detected according to the phase rotation of the carrier phase plane coordinate. Since the shift of the carrier phase is small, compared with the clock timing period, tracking the phase with the clock timing can be carried out without any trouble. Hence, the phase tracking can be performed without an occurrence of an error due to a phase angle deviation.

In the above description, the cumulative adder 12 receives the initial offset angle $\delta_0$ output from the phase angle calculation unit 8 at the time the first clock signal falls down after establishment of symbol synchronization. Instead, the offset phase angle may be first set to $\Delta (=0°)$ in the cumulative adder 12. Thereafter, the phase angle decision unit 13 outputs $\delta_0$ as the shift to the offset phase angle $\Delta$ at the first falling of the click signal after establishment of symbol synchronization and then latches $\delta_0$ to the cumulative adder 12 through the digital filter 14.

Moreover, when the received signal level is lowered or the bit error is increased, the setting of the characteristic of the digital filter 14 may be temporarily changed so that the response characteristic to the shift is changed. Thus, abrupt changes in timing due to noises can be suppressed. The response characteristic can be changed by selecting the number of taps or tap coefficient of the digital filter.

In the above description, the symbol synchronous timing is realized by detecting the inversion of an increasing or decreasing phase angle of a synchronous signal output from the phase angle calculation unit 8. However, the symbol synchronous timing can be provided using a method other than the phase angle calculation.

Figure 6:
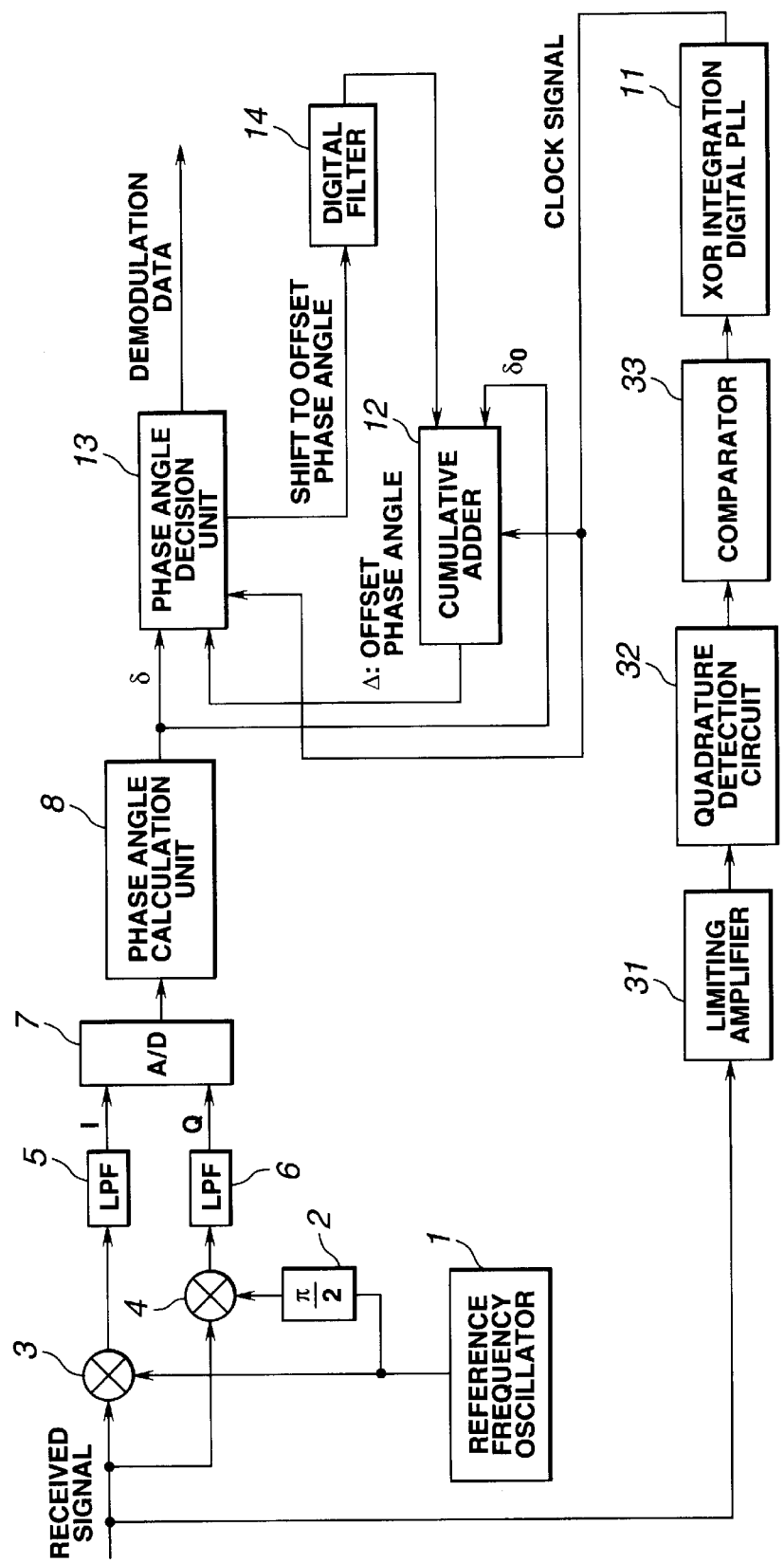
FIG. 6 is a block circuit diagram illustrating a symbol synchronous device according to the second embodiment of the present invention.
Figure 7:
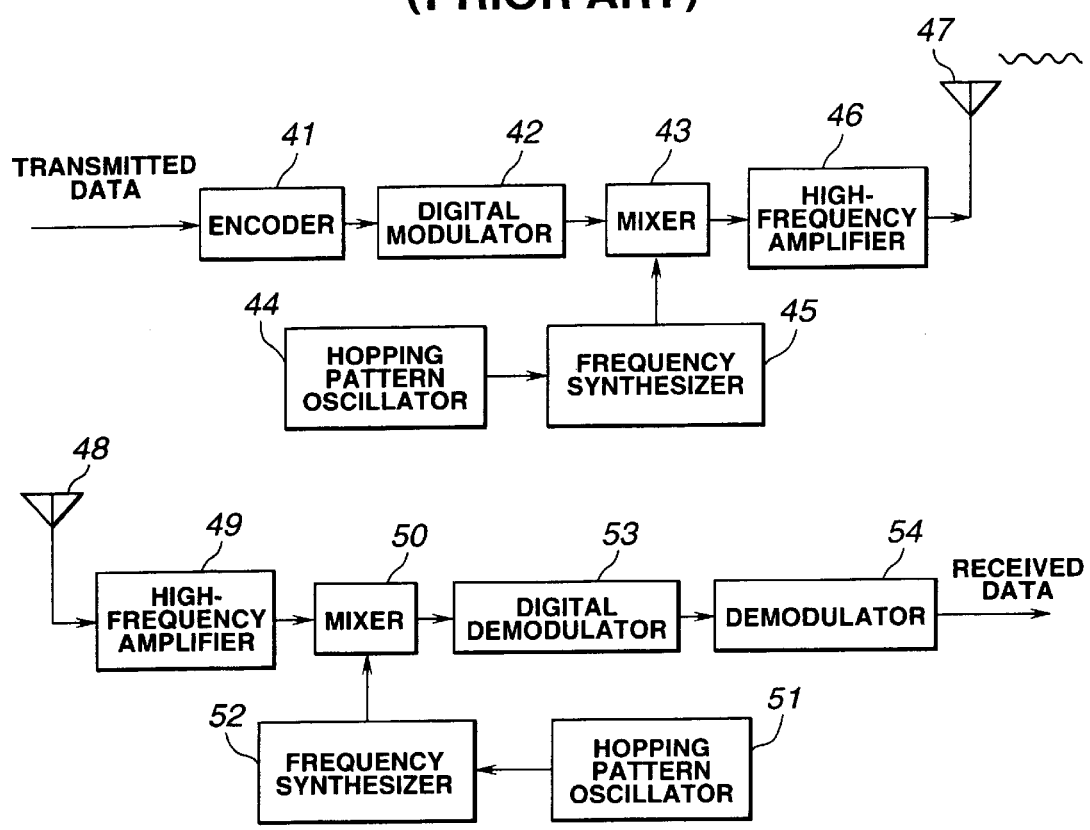
FIG. 7 is a block diagram illustrating a conventional frequency hopping system.

FIG. 6 is a block diagram illustrating the symbol synchronous device according to the second embodiment of the present invention. Referring to FIG. 6, like numerals represent the same constituent elements as those in FIG. 1. Hence, the duplicate description will be omitted here. Numeral 31 represents a limiting amplifier; 32 represents a quadrature detection circuit; and 33 represents a comparator.

The limiting amplifier 31 implements the amplitude limitation amplification of the received signal in the intermediate frequency band. Then, the quadrature detection circuit 32 frequency-discriminates the amplified received signal. The comparator 33 discriminates the level of the output of the quadrature detection circuit 32. Thus, the pulse signal equivalent to that from the decision unit 10 of FIG. 1 can be obtained. Like the first embodiment, the conventional synchronous signal is used as the synchronous signal. The synchronous signal has been defined as the QPSK signal but is equivalent to the signal which repeatedly transmits information 1, 0, 1, 0, . . . under the MSK (Minimum Shift Keying) modulation with a modulation index of 0.5. That is, the frequency increases or decreases every time the phase angle moves between signal points.

Figure 8:
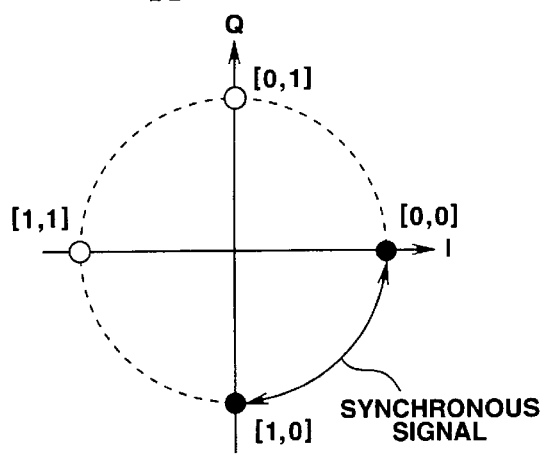
FIG. 8 is an IQ phase plane coordinate diagram illustrating signal points in quadrature phase modulation (QPSK)
Figure 11:
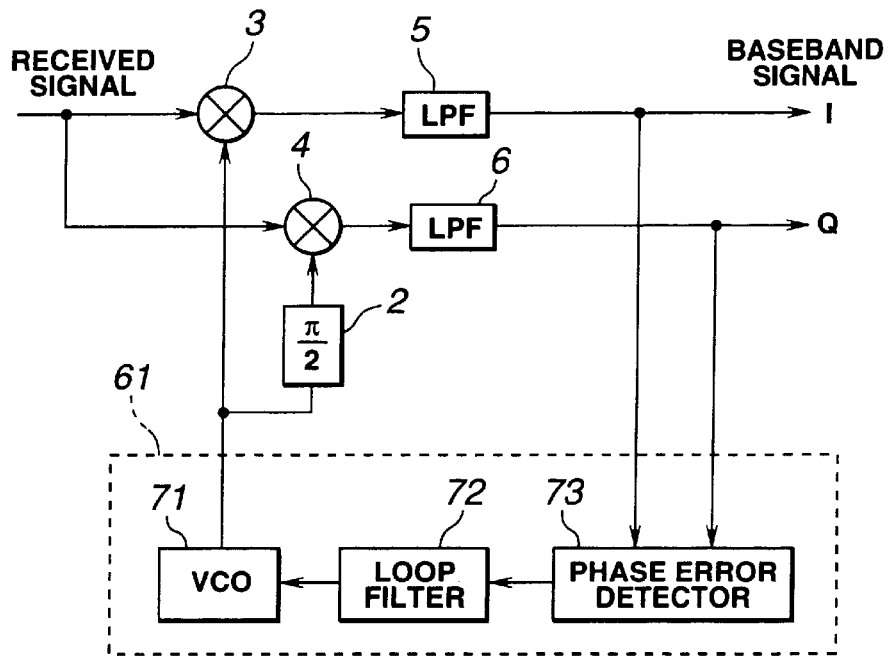
FIG. 11 is a block schematic diagram illustrating the carrier regeneration circuit 61 shown in FIG. 9.
Figure 12:
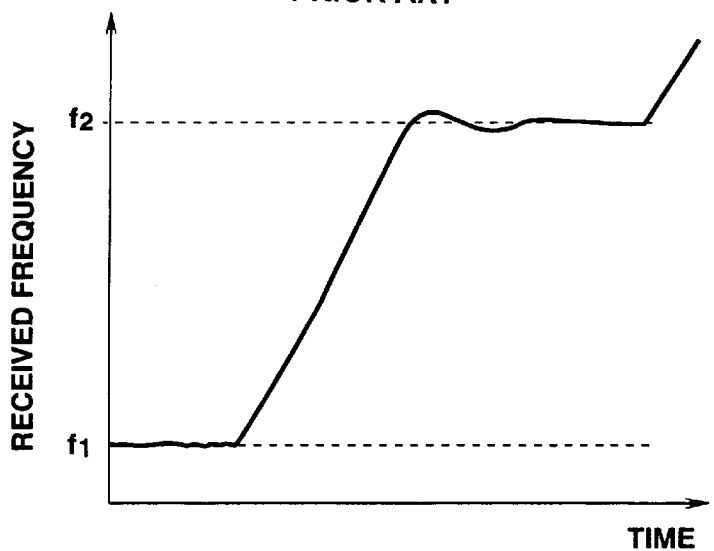
FIG. 12 is an explanatory diagram illustrating carrier frequency changes in the frequency hopping system.

Hence, the quadrature detection circuit 32 outputs the signal of which the level becomes high and low alternately according to changes in frequency. The timing of the level change corresponds to the timing of each of the signal points (0, 0) and (1, 0) shown in FIG. 8. The comparator 33 compares the output of the detection circuit 33 with a predetermined threshold to output the pulse signal similar to the output of the decision unit 10 shown in FIG. 4(c). The resultant pulse is input as a reference signal to the XOP integration digital PLL 11.

The above description relates to the QPSK modulation. The BPSK and QAM can be applied to the digital modulation carried out based on the signal point on the carrier phase plane coordinate. This feature is maintained even if the phase angle of a signal point is of two types or of 4 types or more. In the case of the QAM digital modulation where information is carried on the magnitude level, the magnitude level is calculated based on the baseband received signals I and Q. Then, demodulation data is output using both the magnitude level and the phase angle output from the phase angle calculation unit 8.

The synchronous signal is not limited to [0, 0] and [1, 0] if it varies ±90° between signal points. For instance, the synchronous signal may varies between signal points [0, 0] and [0, 1]. Moreover, the synchronous signal where the phase rotational direction to a carrier is reversed at the signal point with a different phase angle to the carrier may be used as the above-mentioned synchronous signal. However, in this case, when the signal point varies ±180° as shown with [0, 0] and [1, 1], it may become difficult to specify the rotational direction of the phase change between the signal points. The QAM modulation allows a more variety of changes between signal points to be used.

In the above description, the oscillation frequency of the reference frequency oscillator 1 is not controlled because the carrier regeneration is not executed. However even when the frequency of the reference frequency oscillator 1 is synchronized with the carrier, the present invention can provide the symbol synchronization in a short time. Moreover, according to the embodiments of the present invention, demodulation data is output following the carrier phase. Hence, the demodulation data can be output following the carrier phase during the period where the carrier synchronization is established.

In the above description, the phase angle decision unit 13 receives the phase angle produced by the phase angle calculation unit 8 and the offset phase angle and then decides demodulation data. Instead, the phase angle calculation unit 8 may output a corrected offset phase angle. The phase angle calculation unit 8 may output demodulation data as well as the shift to the offset phase angle.

As described above, the carrier phase follower that executes the digital demodulation in the frequency hopping receiver has been shown. Particularly, the present invention is preferable because when a burst signal with a small amount of data to be once handled is transmitted, demodulation data can follow the carrier phase in short time under the symbol synchronization.

As clearly understood from the above-mentioned description, the present invention has the advantage in that high-rate symbol synchronization can be performed, without any carrier regeneration, by executing the symbol synchronization immediately from the beginning of the reception.

Moreover, the present invention has the advantage in that the symbol synchronization is not adversely affected due to variations in carrier frequency after a frequency change of the frequency hopping receiver.

What is claimed is:

1. A symbol synchronous device that receives a synchronous signal at a signal point with a different phase degree to a carrier, said synchronous signal in which a phase rotational direction is reversed to said carrier, and then produces a decision timing in synchronous with a symbol of a digital-modulated signal, comprising:

reverse timing detection means for detecting a reverse timing at which the rotational direction of a phase angle of said digital-modulated signal is reversed; and clock signal output means for outputting a clock signal providing said decision timing in synchronous with said reverse timing, wherein said reverse timing detection means detects said reverse timing based on the phase angle of said digital-modulated signal with respect to a reference frequency signal, and said clock signal output means for outputting produces a pulse signal and controls the oscillation frequency of said pulse signal according to an integration value of phase errors between said pulse signal and a reference pulse signal reversed at said reverse timing, thus outputting said clock signal in synchronous with said reverse timing.

2. The symbol synchronous device as defined in claim 1, wherein said reverse timing detection means detects said reverse timing based on a change in polarity of a differential of the phase angle of said digital-modulated signal.

3. A symbol synchronous device that receives a synchronous signal at a signal point with a different phase degree to a carrier, said synchronous signal in which a phase rotational direction is reversed to said carrier, and then produces a decision timing in synchronous with a symbol of a digital-modulated signal, comprising:

reverse timing detection means for detecting a reverse timing at which the rotational direction of the phase angle of said digital-modulated signal is reversed; and clock signal output means for outputting a clock signal providing said decision timing in synchronous with said reverse timing, wherein said reverse timing detection means detects said reverse timing based on a change in frequency of said digital-modulated signal, wherein said clock signal output means for outputting produces a pulse signal and controls the oscillation frequency of said pulse signal according to an integration value of phase errors between said pulse signal and a reference pulse signal reversed at said reverse timing, thus outputting said clock signal in synchronous with said reverse timing.

4. A frequency hopping receiver comprising:

a symbol synchronous device that receives a synchronous signal at a signal point every time a frequency channel changes, said signal point having a different phase degree to a carrier, said synchronous signal in which a phase rotational direction is reversed to said carrier, and then produces a decision timing in synchronous with a symbol of a digital-modulated signal, said symbol synchronous device comprising:

reverse timing detection means for detecting a reverse timing at which the rotational direction of a phase angle of said digital-modulated signal is reversed; and clock signal output means for outputting a clock signal providing said decision timing in synchronous with said reverse timing, wherein said reverse timing detection means detects said reverse timing based on the phase angle of said digital-modulated signal with respect to a reference frequency signal, wherein said clock signal output means output a pulse signal and control the oscillation frequency of said pulse signal according to an integration value of phase errors between said pulse signal and a reference pulse signal reversed at said reverse timing, thus outputting said clock signal in synchronous with said reverse timing.

5. A frequency hopping receiver comprising:

a symbol synchronous device that receives a synchronous signal at a signal point every time a frequency channel changes, said signal point having a different phase degree to a carrier, said synchronous signal in which a phase rotational direction is reversed to said carrier, and then produces a decision timing in synchronous with a symbol of a digital-modulated signal, said symbol synchronous device comprising:

reverse timing detection means for detecting a reverse timing at which the rotational direction of phase angle of said digital-modulated signal is reversed; and clock signal output means for outputting a clock signal providing said decision timing in synchronous with said reverse timing, wherein said reverse timing detection means detects said reverse timing based on a change in polarity of a differential of the phase angle of said digital-modulated signal, wherein said clock signal output means output a pulse signal and control the oscillation frequency of said pulse signal according to an integration value of phase errors between said pulse signal and a reference pulse signal reversed at said reverse timing, thus outputting said clock signal in synchronous with said reverse timing.

6. A frequency hopping receiver comprising:
a symbol synchronous device that receives a synchronous signal at a signal point every time a frequency channel changes, said signal point having a different phase degree to a carrier, said synchronous signal in which a phase rotational direction is reversed to said carrier, and then produces a decision timing in synchronous with a symbol of a digital-modulated signal, said symbol synchronous device comprising:
reverse timing detection means for detecting a reverse timing at which the rotational direction of the phase angle of said digital-modulated signal is reversed; and
clock signal output means for outputting a clock signal providing said decision timing in synchronous with said reverse timing, wherein said reverse timing detection means detects said reverse timing based on a change in frequency of said digital-modulated signal, wherein
said clock signal output means output a pulse signal and control the oscillation frequency of said pulse signal according to an integration value of phase errors between said pulse signal and a reference pulse signal reversed at said reverse timing, thus outputting said clock signal in synchronous with said reverse timing.

7. A symbol synchronous device that receives a synchronous signal at a signal point with a different phase degree to a carrier, comprising:
a reverse timing detector configured to detect a reverse timing at which a rotational direction of a phase angle of a digital-modulated signal is reversed; and
a clock signal output device configured to output a clock signal providing a decision timing in synchronous with said reverse timing, wherein
said reverse timing detector comprises a detector configured to detect said reverse timing based on the phase angle of said digital-modulated signal with respect to a reference frequency signal, and
said clock signal output device comprises an output device configured to produce a pulse signal and control an oscillation frequency of said pulse signal according to an integration value of phase errors between said pulse signal and a reference pulse signal reversed at said reverse timing, thus outputting said clock signal in synchronous with said reverse timing.

8. The symbol synchronous device as defined in claim 7, wherein said reverse timing:
detector is configured to detect said reverse timing based on a change in polarity of a differential of the phase angle of said digital-modulated signal.

9. A symbol synchronous device that receives a synchronous signal at a signal point with a different phase degree to a carrier, comprising:
a reverse timing detector configured to detect a reverse timing at which a rotational direction of a phase angle of a digital-modulated signal is reversed; and
a clock signal output device configured to output a clock signal providing a decision timing in synchronous with said reverse timing, wherein
said reverse timing detector comprises a detector configured to detect said reverse timing based on a change in frequency of said digital-modulated signal, and
said clock signal output device comprises an output device configured to produce a pulse signal and control an oscillation frequency of said pulse signal according to an integration value of phase errors between said pulse signal and a reference pulse signal reversed at said reverse timing, thus outputting said clock signal in synchronous with said reverse timing.

10. A frequency hopping receiver, comprising:
a reverse timing detector configured to detect a reverse timing at which a rotational direction of a phase angle of a digital-modulated signal is reversed; and
a clock signal output device configured to output a clock signal providing a decision timing in synchronous with said reverse timing, wherein
said reverse timing detector comprises a detector configured to detect said reverse timing based on the phase angle of said digital-modulated signal with respect to a reference frequency signal, and
said clock signal output device comprises an output device configured to output a pulse signal and control an oscillation frequency of said pulse signal according to an integration value of phase errors between said pulse signal and a reference pulse signal reversed at said reverse timing, thus outputting said clock signal in synchronous with said reverse timing.

11. A frequency hopping receiver, comprising:
a reverse timing detector configured to detect a reverse timing at which a rotational direction of a phase angle of a digital-modulated signal is reversed; and
a clock signal output device configured to output a clock signal providing a decision timing in synchronous with said reverse timing, wherein
said reverse timing detector comprises a detector configured to detect said reverse timing based on a change in polarity of a differential of the phase angle of said digital-modulated signal, and
said clock signal output device comprises an output device configured to output a pulse signal and control an oscillation frequency of said pulse signal according to an integration value of phase errors between said pulse signal and a reference pulse signal reversed at said reverse timing, thus outputting said clock signal in synchronous with said reverse timing.

12. A frequency hopping receiver, comprising:
a reverse timing detector configured to detect a reverse timing at which a rotational direction of a phase angle of a digital-modulated signal is reversed; and
a clock signal output device configured to output a clock signal providing a decision timing in synchronous with said reverse timing, wherein
said reverse timing detector comprises a detector configured to detect said reverse timing based on a change in frequency of said digital-modulated signal, and
said clock signal output device comprises an output device configured to output a pulse signal and control an oscillation frequency of said pulse signal according to an integration value of phase errors between said pulse signal and a reference pulse signal reversed at said reverse timing, thus outputting said clock signal in synchronous with said reverse timing.

13. A method for receiving a synchronous signal at a signal point with a different phase degree to a carrier, comprising:
detecting a reverse timing at which a rotational direction of a phase angle of a digital-modulated signal is reversed; and
outputting a clock signal providing a decision timing in synchronous with said reverse timing, wherein said detecting step comprises:

detecting said reverse timing based on the phase angle of said digital-modulated signal with respect to a reference frequency signal, wherein said outputting step comprises:

producing a pulse signal;

controlling an oscillation frequency of said pulse signal according to an integration value of phase errors between said pulse signal and a reference pulse signal reversed at said reverse timing; and outputting said clock signal in synchronous with said reverse timing.

14. A method for receiving a synchronous signal at a signal point with a different phase degree to a carrier, comprising:

detecting a reverse timing at which a rotational direction of a phase angle of a digital-modulated signal is reversed; and outputting a clock signal providing a decision timing in synchronous with said reverse timing, wherein said detecting step comprises:

detecting said reverse timing based on a change in polarity of a differential of the phase angle of said digital-modulated signal, wherein said outputting step comprises:

producing a pulse signal;

controlling an oscillation frequency of said pulse signal according to an integration value of phase errors between said pulse signal and a reference pulse signal reversed at said reverse timing; and outputting said clock signal in synchronous with said reverse timing.

15. A method for receiving a synchronous signal at a signal point with a different phase degree to a carrier, comprising:

detecting a reverse timing at which a rotational direction of a phase angle of a digital-modulated signal is reversed; and outputting a clock signal providing a decision timing in synchronous with said reverse timing, wherein said detecting step comprises:

detecting said reverse timing based on a change in frequency of said digital-modulated signal, wherein said outputting step comprises:

producing a pulse signal;

controlling an oscillation frequency of said pulse signal according to an integration value of phase errors between said pulse signal and a reference pulse signal reversed at said reverse timing; and outputting said clock signal in synchronous with said reverse timing.

16. A method for receiving a frequency-hopped signal, comprising:

detecting a reverse timing at which a rotational direction of a phase angle of a digital-modulated signal is reversed; and outputting a clock signal providing a decision timing in synchronous with said reverse timing, wherein said detecting step comprises:

detecting said reverse timing based on the phase angle of said digital-modulated signal with respect to a reference frequency signal, wherein said outputting step comprises:

outputting a pulse signal;

controlling an oscillation frequency of said pulse signal according to an integration value of phase errors between said pulse signal and a reference pulse signal reversed at said reverse timing; and outputting said clock signal in synchronous with said reverse timing.

17. A method for receiving a frequency-hopped signal, comprising:

detecting a reverse timing at which a rotational direction of a phase angle of a digital-modulated signal is reversed; and outputting a clock signal providing a decision timing in synchronous with said reverse timing, wherein said detecting step comprises:

detecting said reverse timing based on a change in polarity of a differential of the phase angle of said digital-modulated signal, wherein said outputting step comprises:

outputting a pulse signal;

controlling an oscillation frequency of said pulse signal according to an integration value of phase errors between said pulse signal and a reference pulse signal reversed at said reverse timing; and outputting said clock signal in synchronous with said reverse timing.

18. A method for receiving a frequency-hopped signal, comprising:

detecting a reverse timing at which a rotational direction of a phase angle of a digital-modulated signal is reversed; and outputting a clock signal providing a decision timing in synchronous with said reverse timing, wherein said detecting step comprises:

detecting said reverse timing based on a change in frequency of said digital-modulated signal, wherein said outputting step comprises:

outputting a pulse signal;

controlling an oscillation frequency of said pulse signal according to an integration value of phase errors between said pulse signal and a reference pulse signal reversed at said reverse timing; and outputting said clock signal in synchronous with said reverse timing.

\* \* \* \* \*